United States Patent [19]

Olsson et al.

[11] 4,237,971
[45] Dec. 9, 1980

[54] COLD-WELDED HEAT EXCHANGER MEMBER

[75] Inventors: Göran B. K. Olsson, Lotorp; Gunnar T. Wilson, Finspang, both of Sweden

[73] Assignee: Gränges Aluminium Aktiebolag, Stockholm, Sweden

[21] Appl. No.: 5,833

[22] Filed: Jan. 23, 1979

[30] Foreign Application Priority Data

Jan. 24, 1978 [SE] Sweden .................. 7800864

[51] Int. Cl.³ .................. F28F 1/22; F24J 3/02
[52] U.S. Cl. .................. 165/171; 29/157.3 C; 29/521; 126/447
[58] Field of Search .................. 165/170, 171, 183; 29/157.3 C, 521; 126/446, 447

[56] References Cited

U.S. PATENT DOCUMENTS

| | | | |
|---|---|---|---|
| 3,962,766 | 6/1976 | Pompidor et al. | 29/157.3 B |
| 4,008,845 | 2/1977 | Bleckmann | 29/521 |
| 4,062,350 | 12/1977 | Reed | 165/183 |
| 4,066,121 | 1/1978 | Kleine et al. | 165/170 |
| 4,069,811 | 1/1978 | Tabor | 165/171 |
| 4,120,351 | 10/1978 | Kleine et al. | 165/170 |
| 4,158,908 | 6/1979 | Block et al. | 29/157.3 C |
| 4,160,476 | 7/1979 | Ashton et al. | 165/171 |

FOREIGN PATENT DOCUMENTS

| | | | |
|---|---|---|---|
| 1601240 | 11/1970 | Fed. Rep. of Germany | 165/183 |
| 2734032 | 2/1978 | Fed. Rep. of Germany | 126/446 |
| 2309819 | 11/1976 | France | 165/170 |
| 806707 | 12/1958 | United Kingdom | 165/171 |

*Primary Examiner*—Sheldon Richter
*Attorney, Agent, or Firm*—Browdy and Neimark

[57] ABSTRACT

A heat exchanger for solar collector apparatuses comprises two metal layers (10, 11) abutting each other and at least one metal pipe (12) for a heat-carrying medium arranged between the layers. The metal layers are cold-welded together on either side of the pipe to form heat-conveying fins and the pipe is cold-welded to at least one of the metal layers. The exchanger has a greater total goods thickness at the pipe than at the fins to allow a comparatively high heat-carrying medium pressure. (FIG. 1). For manufacturing the heat exchanger two metal strips and a metal pipe are continuously fed between two rolls, of which at least one is provided with a groove corresponding to the pipe. The roll pressure is selected so that the metal strips and the metal pipe are subjected during cold rolling to a thickness reduction of at least 60% during the passage between the rolls, so that the strips and the pipe are cold-welded together.

8 Claims, 5 Drawing Figures

COLD-WELDED HEAT EXCHANGER MEMBER

The present invention relates to a heat exchanger member, comprising two metal layers abutting one another and at least one pipe arranged between the metal layers for a heat-carrying medium, and a method of producing such a heat exchanger member. The member is particularly intended for use in solar collector apparatuses but can also be used for other purposes, e.g. as a radiator in the heating system for dwellings.

It is already known to manufacture heat exchanger members for solar collectors from aluminium, said material being suitable due to its low weight, its good heat conductivity and its ease of working. However, aluminium has poor corrosion resistance, and solar collector members made entirely of aluminium can therefore be expected to give rise to problems after some time, especially with relation to the ducts which must be arranged in the members for conveying a heat-carrying medium. In order to avoid these corrosion problems, it is desirable to provide the member with through-flow ducts made from some material more resistant to corrosion than aluminium, e.g. copper. In heat exchanger members for solar collectors, it is extremely desirable that the member has a small thermic mass, so that the member can adjust itself to temperature changes which can often occur rapidly, e.g. rapid variations between full sunshine and heavy cloud shadow. The ducts in the element for the heat-carrying medium, volume of which is very limited therein must be so heavily dimensioned that the heat-carrying medium can be put under high pressure for rapid conveyance through the members. These wants result in large demands on the structural form of the heat exchanger member, and can be difficult to fulfil, since they require that the member must have small wall thickness in certain parts and substantially greater wall thickness in other parts.

It is necessary that solar collectors built up from heat exchanger members of the kind described here can be mass produced in a simple and cheap way in order to be economically attractive. The manufacture of heat exchanger members made solely from aluminium, used previously, was enabled in a very simple way by a so-called "roll bond" process, i.e. rolling together two different sheets of aluminium, the roll reduction being selected in such a way that the two sheets were welded into one unit. At least one duct was left through the element by preventing the welding of the material, e.g. by conventional treatment of strip-like portions of the sheets. These unwelded portions could then be subsequently separated from eachother by pressure feed, so that a duct with desired dimensions was obtained through the member.

The main object of the invention is to provide a heat exchanger member having small thermic mass, both with regard to the amount of material in the member itself, and with regard to the amount of heat-carrying medium in the duct through the element, and having corrosion-resistant ducts with heavily dimensioned walls so that the heat-carrying medium can be put under a comparatively high pressure. A further object of the invention is to provide a method of producing such heat exchanger members in a continuous process at high speed, so that the manufacturing cost for each unit will be kept down.

These objects are achieved in accordance with the invention by the heat exchanger member and the method of producing it being given the characterizing features disclosed in the patent claims.

Figure 3:
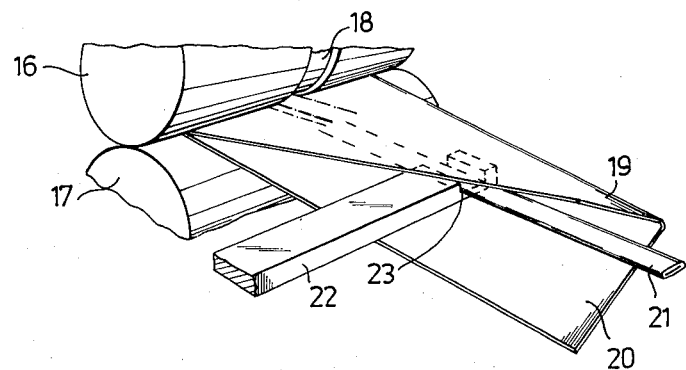

FIG. 3 schematically shows a method of manufacture for a member in accordance with the invention.

Figure 4:
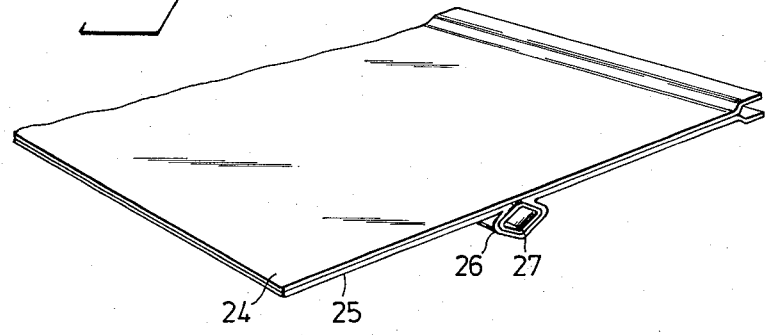

FIG. 4 shows another embodiment of a heat exchanger element according to the invention.

Figure 5:
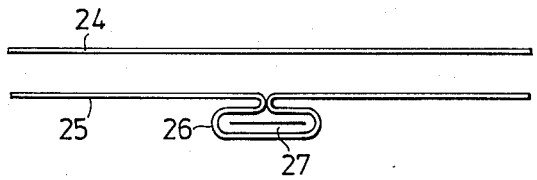

FIG. 5 illustrates the manufacture of the embodiment shown in FIG. 4.

Figure 1:
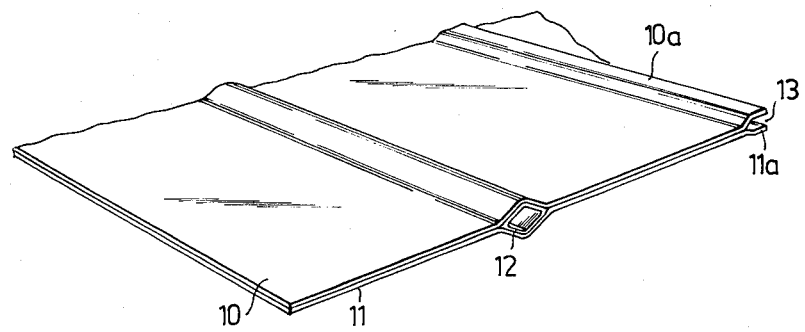
FIG. 1 shows a perspective view of a heat exchanger member in accordance with the invention.

The member shown in FIG. 1 comprises two thin rectangular sheets 10, 11 of aluminium and a copper pipe 12 placed between them. The sheets are welded together on either side of the copper pipe to form fins with large area and small wall thickness for receiving or dissipating heat. The copper pipe runs between the sheets in their longitudinal direction and substantially along the center line of the sheets. The sheets are also welded together with the wall of the copper pipe, so that there is a metallurgical joint between the sheets on either side thereof and between the sheets and the whole envelope surface of the pipe. Very effective heat transfer between the fins and the pipe as well as between the two metal layers in each fin is thus ensured. At one longitudinal edge of the member, the edges 10a, 11a of the two sheets are separated from eachother to form a slot 13, for accommodating the opposite edge of a similar member to form a larger unit of heat exchanger members, as shown in FIG. 2.

The aluminium sheets 10, 11 forming the member according to FIG. 1 suitably have a thickness of 0.1–1.0 mm preferably 0.2–0.3 mm, e.g. 0.25 mm, since it has been found that the so-called "fin efficiency" in the utilization of solar collector apparatuses is optimum for a total fin thickness of about 0.5 mm. The copper pipe 12 suitably has a wall thickness of about 0.2–1.5 mm, preferably 0.3–0.6 mm. e.g. 0.4 mm and an effective conductivity area of about 30 mm$^2$. Each heat exchanger member suitably has a width of about 0.1 m and a length of about 0.5–4.0 m. At one edge of the member, slot 13 has a width approximately the same as the total fin thickness, i.e. the sum of the two plate thicknesses, so that the members can easily be pushed into each other along a longitudinal edge for assembling larger heat exchanger units.

Figure 2:
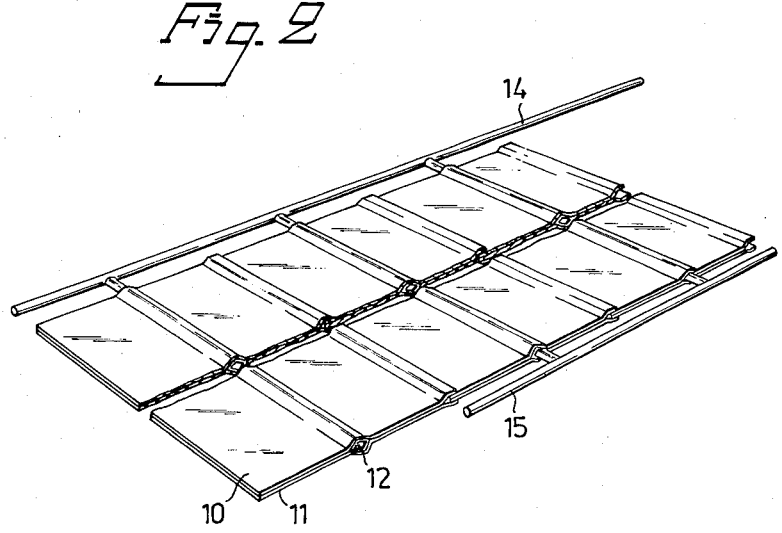
FIG. 2 shows a heat exchanger unit built up from several heat exchanger members of the type shown in FIG. 1

FIG. 2 shows a heat exchanger unit consisting of three coupled members shown in FIG. 1. These members are coupled to eachother along a longitudinal edge by having the unparted edge of the next member inserted in the slot of the member in front of it. The through ducts in the different members are further connected to collection pipes 14, 15 for supply and removal of heat-carrying medium, e.g. water or some other liquid, or possibly a gas, the medium being caused to circulate through the ducts in the members and supply and delivery pipes by means of a suitable driving pump, or in some other way. In certain cases convection in the medium can be sufficient. The medium can naturally be used for removing heat from the member, e.g. when the member is used in a solar collector apparatus, as well as for supplying heat to the member, e.g. when it is used as a radiator in a heating system for dwellings or other places. The unit shown in FIG. 2 has the members coupled in parallel with regard to the flow of the heat-carrying medium, but the members can also be coupled in series. A combination of series and parallel coupling can also be used.

An apparatus for carrying out the method in accordance with the invention is schematically shown in FIG. 3. The apparatus comprises two rolls 16, 17, adjacent eachother, each being provided with a groove 18, although only the groove in the upper roll 16 is shown in the Figure in order to simplify the drawing. The rolls are adapted for compressing two thin sheets of aluminium strip, 19, 20 and a copper pipe 21, lying between the strips when the strips and the pipe are fed between the rolls. The grooves in the two rolls are arranged directly opposite eachother and have a shape corresponding to the shape of a pipe fed between the strips, so that a heat exchanger member with greater total wall thickness at the pipe portion than at the fin portion is obtained after the passage of the strips and the copper pipe between the rolls. Expediently, the grooves 18 are exactly alike. A guide means for the copper pipe is arranged in front of the rolls. This guide means consists of an arm 22 projecting in between the strips, the front end of it being provided with a guide groove 23 complementary to the shape of the pipe fed in and along which the pipe 21 passes. This guide groove is placed directly in front of the grooves in the rolls, so that the copper pipe is fed centrally to the grooves in the rolls.

In the method of producing a heat exchanger member in accordance with the invention, illustrated in FIG. 3, the two strips 19, 20 are formed from a single strip with double width in relations to the finished width of the member, this strip being folded along its middle for forming two strip portions which are subsequently pressed together by means of the rolls. This is particularly advantageous with regard to guiding the strips through the rolls, since the two strip portions are kept together along one longitudinal edge, i.e. the folding line of the wide strip, during feeding between the rolls, so that the strip portions are kept in exact mutual location. However, it is not necessary for the application of the inventive method that the strips are integral, but two separate strips can be used just as well. The pipe 21 should be rolled flat before feeding between the strips 19, 20, since its guidance and the fusion between it and the strips, to be provided by pressing between the rolls, is thus facilitated, even if such flat rolling is not always absolutely necessary.

The heat exchanger member shown in FIG. 4 also comprises two sheets 24, 25 of aluminium, one sheet 24, however, being completely plane and the other sheet 25 being provided with a bend 26 in which a copper pipe 27 is placed. The bend has the shape of a closed loop so that only one sheet abuts against the copper pipe. As in the embodiment according to FIG. 1, the sheets are welded together on either side of the pipe. Furthermore, the sheet 25 is welded to the pipe 27 along the whole envelope surface of the pipe, so that a good heat transfer is provided between the sheet and the pipe.

FIG. 5 schematically illustrates how the heat exchanger member according to FIG. 4 can be manufactured. The Figure shows the two sheets 24, 25 and the copper pipe 27 immediately before the rolling. The lower sheet has been bent in advance in such a way that its central portion has a substantially closed loop 26 in which the copper pipe 27 is placed. The copper pipe has been rolled flat in advance. The lower sheet 25 should have a larger width from the beginning, so that the sheet after the bending of loop 26 has substantially the same width as the upper sheet 24.

In this case, too, the sheets are strips, so that a continuous manufacturing process can be provided. Generally, the rolling apparatus schematically shown in FIG. 3 can be used. However, a few minor modifications have to be made with regard to the guiding arm 22 so that this arm controls the lower strip with the bend including the pipe instead of controlling the pipe only. Furthermore, only one roll has to be provided with a groove. The groove must have dimensions so that the desired thickness reduction is obtained.

In the method in accordance with the invention, the rolls are adjusted to give a pressure such that the strips and pipe are subjected to a thickness reduction of at least 60% by cold rolling. The strip material should thus have an initial thickness of about 0.6 mm and the copper pipe should have a wall thickness of about 1.0 mm before feeding in between the strips. By means of this cold rolling there is obtained a welding of the material in the two strips or strip portions, and of the material in one or both strips or strip portions and the material in the pipe wall, so that a metallurgical joint is provided at the interface in the fins and the interface between the strips and the pipe for the heat-carrying medium.

For the method shown in FIGS. 3 and 5, a strip is used as the initial material for the two layers in the heat exchanger members in accordance with the invention. This has the advantage that manufacture can take place at high speed by continuous uncoiling of the initial material for both strip and pipe from large coils of strip and pipe, and by reeling of the compound strip after rolling. This uncoiling and recoiling in combination with cold rolling between the rolls enables very high feed speeds, e.g. 100–200 m/min., giving an extremely rational and economical production. The material passing between the rolls is subject to a combined rolling and pulling in that recoiling takes place at a somewhat higher speed.

In rolling a strip, all the parts of the strip width must be extended equally, since otherwise the strip will not be flat or will be ripped off. In the present case, this means that all parts of the strip or strips including the pipe must be reduced to the same extent, i.e. by the same percentage. The ratio between the thickness of the aluminium strips before and after rolling must thus be just as great as the ratio between the sum of the thicknesses of the aluminium strip and the wall thickness of the copper pipe before and after rolling. This ratio must be less than 0.4 for the roll reduction to be at least 60%. Since the aluminium sheet shall have the same thickness in the fin as at the pipe, the groove in the apparatus according to FIG. 3 must have a depth equal to the desired wall thickness of the copper pipe after rolling.

The groove and copper pipe must thus have proper dimensions for obtaining a satisfactory final product. If the groove is too shallow, a cracked product will be obtained, and if the groove is too deep, a wavy product will be obtained.

Since the rolls are provided with grooves with a depth corresponding to the wall thickness, after rolling, of the pipe inserted between the strips, there is obtained the essential distinguishing feature of the invention, i.e. that the total material thickness of the heat exchanger member can be varied, so that the fin portions of the member are given a substantially less material thickness than the pipe portion. The advantage ensuring from this is that the fin portions can be dimensioned independent of the pipe portion for best thermal efficiency and that the pipe portion, especially the inserted pipe, can be dimensioned with sole consideration to the demands placed on the ducts for the heat-carrying medium. A heat exchanger member can thus be provided with optimum material utilization, which is more effective from a technical point of view.

For welding to take place between the different layers in the heat exchanger member with a comfortable margin of safety, the different contact surfaces must be cleaned carefully before the rolling operation. This can be done by means of conventional techniques, e.g. wire brushing the surfaces. Welding must be prevented in the bore of the pipe during the rolling procedure. This can be done by coating the pipe bore in a conventional manner with a layer of a preparation intended for the purpose, available on the market. The corresponding procedure can be used for preventing welding between the strips or sheets at the edge zone where the two layers are to be parted to form the groove, described above, for coupling several elements into one unit. After the rolling operation, and cutting up the compound strip into suitable length, the duct through the member must normally be expanded so that the flow area will be sufficient. This can also be done using conventional techniques, by heavy pressure supply to the ends of the duct. The equipment for cleaning the surfaces, cutting up the finished strip into suitable length, expansion of the ducts and other routine measures is not shown in FIG. 3, since it is not a part of the invention. The necessary measures have not been described in detail for the same reason.

In the description of the embodiment of the heat exchanger member in accordance with the invention, shown in FIGS. 1 and 4, it has been said that the member consists of aluminium layers with an intermediately placed copper pipe. It is, however, not necessary that different materials are used in the layers and in the pipe, and the same material can be used just as well. Copper can thus very well be used for the layers, although aluminium is to be preferred because of its lower price and its other good properties. Furthermore, other corrosion-resistant materials than copper can be used for the pipe, if this should be more advantageous for some reason.

Although only two embodiments of the heat exchanger member in accordance with the invention, and only one example of the method in accordance with the invention, have been described and illustrated, it is obvious that many different embodiments and applications of the invention are possible within the purview of the invention. The form and dimensions of the member can thus be varied within wide limits, and the method can be carried out in many different ways. In certain applications it is desirable to provide a member that is symmetrical with respect to the interface between the sheets, e.g. according to FIG. 1, and in other applications it is desirable to provide a member having one flat surface, e.g. according to FIG. 4. The bend in one sheet may have the shape of an open groove (U-shape), a major portion of the surface of the pipe being welded to the bent sheet and only a minor portion of the surface of the pipe being welded to the other sheet. Furthermore, it is possible to provide each member with more than one pipe for the heat-carrying medium but then the manufacturing process will become more complicated, because the difficulties in rolling the strip increase heavily with the width of the sheet or strip to be rolled.

What is claimed is:

1. A heat exchange member, particularly for solar collector apparatuses, comprising first and second metal sheets of substantially equal surface dimensions disposed in a face-to-face relationship and at least one metal tube for a heat-carrying medium disposed therebetween and extending rectilinearly and uninterruptedly from one edge of said first and second metal sheets to an edge of said first and second metal sheets opposite therefrom, said first and second metal sheets being cold-welded to each other so as to be molecularly bonded substantially over their entire mutual contact surface on either side of said tube to form heat-conveying fins, said metal tube being cold-welded so as to be molecularly bonded substantially over its entire circumferential surface to at least one of said first and second metal sheets, and the member having a greater total material thickness at the location of said tube than at said fins.

2. A member as claimed in claim 1, wherein said first metal sheet is provided with a groove in which said tube is located, and said second metal sheet is flat.

3. A member as claimed in claim 2, wherein said groove in said first metal sheet has a substantially closed annular cross-sectional form substantially completely enclosing said tube, substantially the entire circumferential surface of said tube being cold-welded to the inner surface of said groove.

4. A member as claimed in either claim 2 or claim 3, wherein said first and second metal sheets have the same thickness, and said tube has a wall thickness greater than the thickness of each of said first and second metal sheets.

5. A member as claimed in claim 4, wherein each metal sheet has a thickness of 0.1–1.0 mm, preferably 0.2–0.3 mm, and said tube has a wall thickness of 0.2–1.5 mm, preferably 0.3–0.6 mm.

6. A member as claimed in claim 1, wherein said tube is cold-welded over substantially half of its circumferential surface to said first metal sheet and over the other half of its circumferential surface to said second metal sheet.

7. A member as claimed in either claim 1 of claim 6, wherein said first and second metal sheets have the same thickness, and said tube has a wall thickness greater than the thickness of each of said first and second metal sheets.

8. A member as claimed in claim 7, wherein each metal sheet has a thickness of 0.1–1.0 mm, preferably 0.2–0.3 mm, and said tube has a wall thickness of 0.2–1.5 mm, preferably 0.3–0.6 mm.

* * * * *